United States Patent [19]

McCord

[11] 4,375,751
[45] * Mar. 8, 1983

[54] SAFETY CONTROL DEVICE FOR VAPOR GENERATING AND RECOVERING APPARATUS

[76] Inventor: James W. McCord, 9101 Nottingham Pkwy., Louisville, Ky. 40222

[*] Notice: The portion of the term of this patent subsequent to Nov. 10, 1998, has been disclaimed.

[21] Appl. No.: 294,777

[22] Filed: Aug. 20, 1981

[51] Int. Cl.³ ............................ F25B 1/00; B01D 3/42
[52] U.S. Cl. ....................................... 62/126; 62/226; 202/206; 203/2
[58] Field of Search ................. 203/2, 24, 26, DIG. 4, 203/DIG. 18; 202/160, 206; 62/125, 126, 127, 129, 130, 226

[56] References Cited

U.S. PATENT DOCUMENTS

| | | | |
|---|---|---|---|
| 2,447,895 | 8/1948 | Bauman | 62/129 |
| 2,475,069 | 7/1949 | Wood | 62/129 |
| 3,011,956 | 12/1961 | Smith et al. | 202/160 |
| 3,483,092 | 12/1969 | Young | 202/206 |
| 4,003,798 | 1/1977 | McCord | 62/183 |
| 4,299,663 | 11/1981 | McCord | 202/206 |

Primary Examiner—Lloyd L. King
Assistant Examiner—Harry B. Tanner

[57] ABSTRACT

A vapor generating and recovering apparatus for vaporizing a liquid and condensing a vapor, the apparatus including a container having a liquid therein with heating and cooling systems in heat transfer relation with the liquid and vapor in the container. The heating and cooling systems include means to vaporize the liquid and means to condense the vaporized liquid disposed within the container. Temperature or pressure sensing means in the cooling system is utilized to shut down the heating system when a preselected vapor level is exceeded.

3 Claims, 2 Drawing Figures

SAFETY CONTROL DEVICE FOR VAPOR GENERATING AND RECOVERING APPARATUS

BACKGROUND OF THE INVENTION

This invention relates to a vapor generating and recovering apparatus for vaporizing a liquid and condensing a vapor and more particularly relates to an improved safety control device to shut off the heating system for a vapor generating and recovering apparatus when the vapor exceeds a preselected level or an unsafe condition exists in the apparatus.

In the present state of the art, vapor generating and recovering devices for vaporizing and condensing a liquid are utilized in many different applications. For example, in the cleaning of objects such as metallic tools, plastic parts, and the like, hot or boiling solvents have been utilized to remove undesirable soluble and particulate matter from these tools, parts, and the like by immersing the soiled object into hot or boiling solvent. In bringing the solvent to a boiling temperature, a solvent vapor zone is created above the boiling solvent solution in the tank or chamber in which objects may be placed for cleaning. The vaporized solvent is then subjected to cooling or condensing means and is recovered. Examples of this are set forth in U.S. Pat. No. 4,003,798 and U.S. Pat. No. 4,078,974. However, in vapor generating and recovery devices, it is frequently difficult for the cooling means to be sufficient to control the vapor level in the apparatus thereby creating possible hazardous conditions in the area around the apparatus.

SUMMARY OF THE INVENTION

It has now been found that the vapor level of a vapor generating and recovering apparatus can be prevented from escaping the apparatus. The means for preventing vapor overflow from the apparatus is accomplished by a sensing device on the cooling system wherein the sensing device actuates means to shut down the heating system of the apparatus at a predetermined temperature or pressure in the cooling system. In one embodiment which includes means for pumping a portion of the liquid from the liquid zone of the apparatus and spraying it into the vapor zone of the apparatus at a temperature equal to or greater than the vaporizing temperature of the liquid, the pump can also be shut off at a predetermined condition of the cooling system. Thus, when an unsafe condition exists, the means creating the unsafe condition is shut down. The sensing device may be set to operate for a given temperature or pressure range for a refrigerant in the cooling system and when the temperature or pressure of the refrigerant is outside the range, then the means responsible for creating the high or low temperature or pressure of the refrigerant is deactivated or shut down.

Various other features of the present invention will become obvious to those skilled in the art upon reading the disclosure set forth hereinafter.

More particularly, in a vapor generating and recovering apparatus for vaporizing a liquid and condensing a vapor, including a housing having at least one compartment therein, the compartment having a liquid therein, and heating and cooling systems therein, the improvement comprising: a sensing means on the cooling system in deactivating communication with means that create an unsafe condition in the apparatus, said sensing means being responsive to preselected conditions of said cooling means.

In the preferred utilization of the vapor generating and recovering apparatus of the present invention, more fully described embodiments of the apparatus are hereinafter described.

BRIEF DESCRIPTION OF THE DRAWINGS

Referring to the drawings.

DESCRIPTION OF THE PREFERRED EMBODIMENTS

Figure 1:
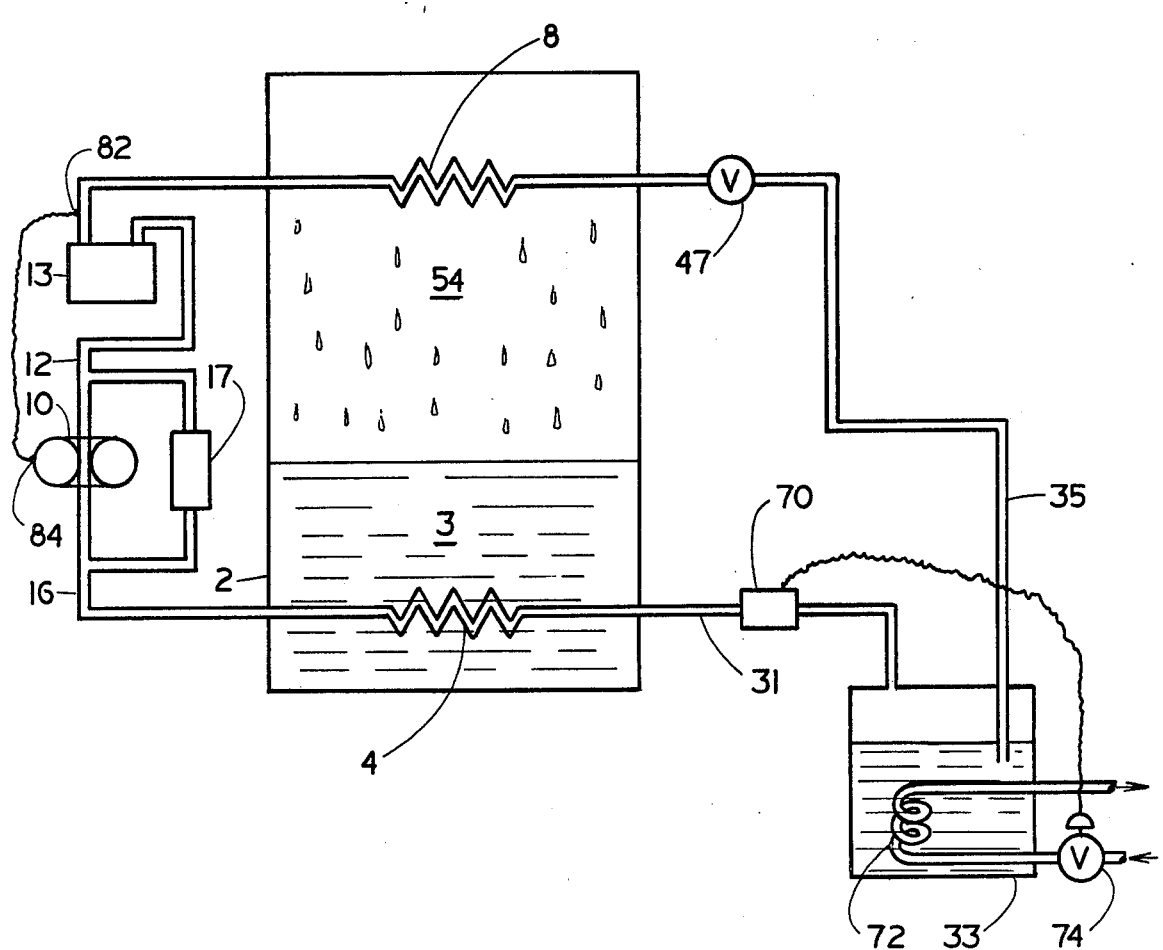
FIG. 1 is a schematic diagram of a vapor generating device including a preferred safety control device of the present invention; and, FIG. 2 is a schematic diagram of another vapor generating device including another preferred safety control device of the present invention.

In FIG. 1, a container 2 for vaporizing a liquid 3 and then condensing the vaporized liquid is provided. Disposed within the liquid and near the bottom of the container 2 is a heating coil 4 which provides heat to vaporize the liquid 3. Heating coil 4 is a condensing coil in a heating and cooling system to be discussed hereinafter.

Disposed within the vapor zone of the container 2 is a cooling coil 8, cooling coil 8 being generally an evaporating coil in the heating and cooling system which will be discussed hereinafter. Cooling coil 8 is provided to maintain a preselected vapor condition in the container.

In the heating and cooling system of FIG. 1, shown schematically, a compressor 10, of the type used in refrigerating systems, compresses a suitable refrigerant which flows to the compressor 10 in a refrigerant section conduit 12. Provided within conduit 12 is a suction accumulator 13 which conditions the refrigerant to compressor 10. Suction accumulator 13 is utilized to provide gaseous refrigerant to compressor 10.

Compressor 10 compresses the suitable gaseous refrigerant to a preselected pressure and the pressurized hot refrigerant gas flows from the compressor 10 through conduit 16 to the heating coil 4, discussed previously, wherein the refrigerant is condensed therein and upon condensing vaporizes the liquid 3 which is disposed within container 2.

Dual pressure control switch 17 is provided and operable in response to a change in the pressure on each side of the compressor 10 and is a feature utilized to shut down the heating and cooling system when the system is being pumped down or exceeds preselected upper pressure limits.

The condensed or pressurized liquid refrigerant leaving the heating coil 4 flows through conduit 31 to a liquid refrigerant receiver 33. In a preferred embodiment, receiver 33 operates as a complementary condenser to balance system energy. In this mode, receiver 33 includes a heat exchanger 72 operable in response to the actuation of a pressure sensing device 70 in line 31. The heat transfer fluid may be water and is controlled by actuating of control valve 74 in response to the preselected pressure sensed by sensing device 70. From the liquid refrigerant receiver 33, the refrigerant flows by way of conduit 35 through an expansion valve 47 to evaporating coil 8.

A pressure or temperature sensing device 82 is provided downstream of the evaporating coil 8 and upstream of the compressor 10 to monitor the temperature and/or pressure of the refrigerant on the low pressure side of the heating and cooling system. Compressor 10 as noted at numeral 84 is in electrical communication with and deactivated in response to sensing device 82. Shut down of the compressor 10 occurs when the temperature or pressure of the refrigerant varies from a preselected condition as this condition will indicate that the heating and cooling system is out of balance, that is, the vapor exceeds a preselected level creating an unsafe condition. Once the condition that created the high vapor level is corrected, then the system may be restarted. It is also realized that conditions that create other unsafe systems or a collapsing vapor level may be monitored by the sensing device to shut the system down when the refrigerant temperature or pressure deviates from a preselected range.

Figure 2:
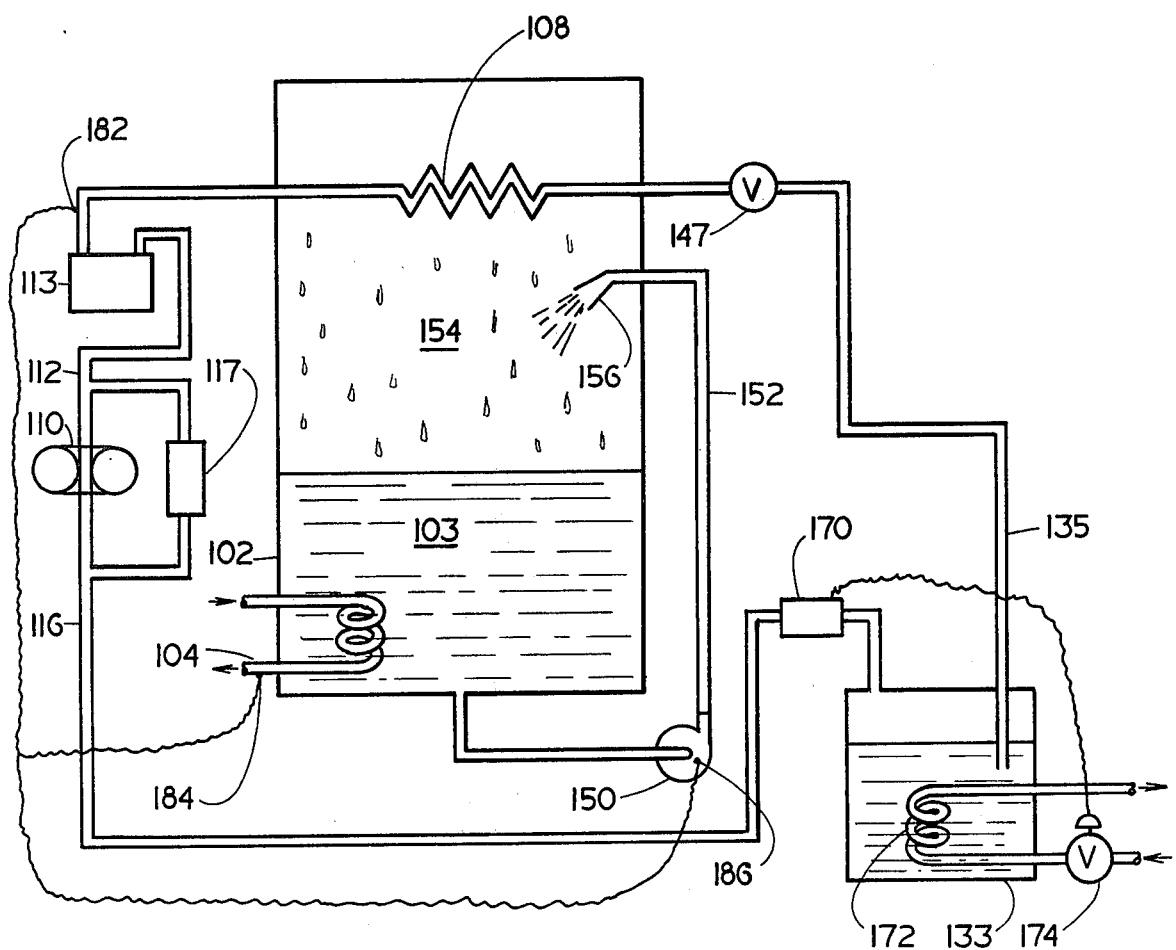

In FIG. 2, a container 102 for vaporizing a liquid 103 and then condensing the vaporized liquid is provided. Disposed within the liquid and near the bottom of the container 102 is a heating coil 104 which provides heat to vaporize the liquid 103. Heating coil 104 may be an electrical heater in a heating system or may contain a heated heat transfer fluid, or the like. Furthermore, heating coil 104 may be a condensing coil in a heating and cooling system such as the one discussed hereinbefore in reference to FIG. 1.

Disposed within the vapor zone of the container 102 is a cooling coil 108, cooling coil 108 being generally an evaporating coil in a cooling system which will be discussed hereinafter. Cooling coil 108 is provided to maintain a preselected vapor condition in the container. It is also realized that cooling coil 108 may be included in other known cooling means, such as a conduit with cold water, or the like, therein.

In the cooling system of FIG. 2, shown schematically, a compressor 110, of the type used in refrigerating systems, compresses a suitable refrigerant which flows to the compressor 110 in a refrigerant section conduit 112. Provided within conduit 112 is a suction accumulator 113 which conditions the refrigerant to compressor 110.

Compressor 110 compresses the suitable gaseous refrigerant to a preselected pressure and the pressurized hot refrigerant gas flows from the compressor 110 through conduit 116 to the receiver 133 wherein the refrigerant is condensed.

Dual pressure control switch 117 is provided and operable in response to a change in the pressure on each side of the compressor 110 and is a feature utilized to shut down the cooling system when the system is being pumped down or exceeds preselected upper pressure limits.

As noted hereinbefore, the condensed or pressurized liquid refrigerant leaving compressor 110 flows through conduit 116 to conventional liquid refrigerant receiver 133. In a preferred embodiment, receiver 133 operates as a condenser to balance system energy. In this mode, receiver 133 includes a heat exchanger 172 operable in response to the actuation of a pressure sensing device 170 in line 116. The heat transfer fluid may be water and is controlled by actuating of control valve 174 in response to the preselected pressure sensed by sensing device 170. From the liquid refrigerant receiver 133, the refrigerant flows by way of conduit 135 through an expansion valve 147 to evaporating coil 108.

In FIG. 2, hot boiling solvent is pumped from the bottom of container 102 by pump 150 through conduit 152 to the vapor zone 154. Solvent 103 is then sprayed by a known spray device 156 into the vapor zone 154.

A pressure or temperature sensing device 182 is provided downstream of the evaporating coil 108 and upstream of the compressor 110 to monitor the temperature or pressure of the refrigerant on the low pressure side of the cooling system. Means for providing heat to heating coil 104 as noted at numeral 184 is shut down in response to sensing device 182 and pump 150 as noted at numeral 184 is de-actuated also in response to sensing device 182. When the temperature or pressure in conduit 112 varies from a preselected condition, this indicates that the heating and cooling system is out of balance, that is, the vapor exceeds a preselected level or the vapor may have collapsed which includes a no-vapor condition at start-up and the solvent being sprayed may be ready to escape from the apparatus. In either case, an unsafe condition will exist and the means creating the unsafe condition is shut down. When the unsafe condition has been corrected, the system may be re-started.

It will be realized that various changes may be made to the specific embodiments shown and described without departing from the principles and spirit of the present invention.

What is claimed is:

1. In a vapor generating and recovering apparatus for vaporizing a liquid and condensing vapor, including a housing having at least one compartment therein, said compartment having a liquid and a vapor therein, and a heating and cooling system to vaporize the liquid and condense the vapor, said system including a refrigerant compressor, a refrigerant condenser, expansion means, a refrigerant evaporator in heat exchange relation with the vapor, and conduit means in flow communication with said condenser, said expansion means, and said evaporator, said system further including a heat transfer fluid therein, the improvement comprising:

a sensing means on the low pressure side of the heating and cooling system in de-activating communication with means that create an unsafe vapor level condition in the apparatus, said sensing means being responsive to de-activate said refrigerant compressor in response to preselected conditions of said cooling means which create said unsafe vapor level.

2. In the vapor generating and recovering apparatus of claim 1, said sensing means being a temperature sensing means.

3. In the vapor generating and recovering apparatus of claim 1, said sensing means being a pressure sensing means.

* * * * *